US008149801B2

(12) United States Patent
Hall

(10) Patent No.: US 8,149,801 B2
(45) Date of Patent: Apr. 3, 2012

(54) SYSTEM AND METHOD FOR GEOCASTING IN A MOBILE AD HOC NETWORK

(75) Inventor: Robert Hall, Berkeley Heights, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1036 days.

(21) Appl. No.: 11/893,813

(22) Filed: Aug. 17, 2007

(65) Prior Publication Data

US 2009/0046628 A1 Feb. 19, 2009

(51) Int. Cl.
H04W 4/00 (2009.01)
(52) U.S. Cl. ........................................................ 370/338
(58) Field of Classification Search ........................ None
See application file for complete search history.

(56) References Cited

U.S. PATENT DOCUMENTS

| 6,304,556 | B1 | 10/2001 | Haas |
| 6,628,620 | B1 | 9/2003 | Cain |
| 6,781,971 | B1 | 8/2004 | Davis et al. |
| 6,807,165 | B2 | 10/2004 | Belcea |
| 6,816,460 | B1 | 11/2004 | Ahmed et al. |
| 6,870,846 | B2 | 3/2005 | Cain |
| 6,879,574 | B2 | 4/2005 | Naghian et al. |
| 6,909,706 | B2 | 6/2005 | Wilmer et al. |
| 6,937,602 | B2 | 8/2005 | Whitehill et al. |
| 6,940,832 | B2 | 9/2005 | Saadawi et al. |
| 6,954,435 | B2 | 10/2005 | Billhartz et al. |
| 6,958,986 | B2 | 10/2005 | Cain |
| 7,027,822 | B1 | 4/2006 | Hwang et al. |
| 7,152,110 | B2 * | 12/2006 | Pierce .......................... 370/310 |
| 7,197,326 | B2 | 3/2007 | Acampora |
| 7,295,521 | B2 | 11/2007 | Choi et al. |
| 7,307,978 | B2 | 12/2007 | Carlson |
| 7,525,933 | B1 * | 4/2009 | Hall ............................... 370/310 |
| 7,613,467 | B2 * | 11/2009 | Fleischman .................... 370/352 |
| 7,813,326 | B1 * | 10/2010 | Kelm et al. ..................... 370/338 |
| 7,917,169 | B1 | 3/2011 | Hall |
| 7,969,914 | B1 | 6/2011 | Gerber |
| 2002/0141454 | A1 | 10/2002 | Muniere |
| 2002/0155846 | A1 | 10/2002 | Shiraga |
| 2002/0163912 | A1 | 11/2002 | Carlson |
| 2002/0167960 | A1 | 11/2002 | Garcia-Luna-Aceves |
| 2003/0235158 | A1 | 12/2003 | Lee |
| 2004/0213270 | A1 | 10/2004 | Su et al. |
| 2005/0058151 | A1 | 3/2005 | Yeh |
| 2005/0096065 | A1 | 5/2005 | Fleischman |
| 2005/0152318 | A1 | 7/2005 | Elbatt et al. |
| 2005/0152378 | A1 * | 7/2005 | Bango et al. .................. 370/400 |

(Continued)

OTHER PUBLICATIONS

U.S. Appl. No. 12/837,168, filed Jul. 15, 2010, Hall.
U.S. Appl. No. 12/793,460, filed Jun. 3, 2010, Hall.
U.S. Appl. No. 12/914,886, filed Oct. 28, 2010, Hall.
U.S. Appl. No. 11/264,834, filed Nov. 1, 2005, Hall.
U.S. Appl. No. 12/969,386, filed Dec. 15, 2010, Hall.
U.S. Appl. No. 13/169,892, filed Jun. 27, 2011, Hall.

(Continued)

Primary Examiner — Anh-Vu Ly
(74) Attorney, Agent, or Firm — Woodcock Washburn LLP

(57) ABSTRACT

Disclosed is a wireless terminal that determines whether to retransmit a received packet. The wireless terminal is configured to determine a first distance from the wireless terminal to a point (e.g., the center point) in a geocast region. The wireless terminal is also configured to determine a plurality of distances between the point and each of a plurality of wireless terminals from which the wireless terminal has previously received a packet having an identifier that is the same as an identifier of the received packet. The wireless terminal is configured to retransmit the received packet if the first distance is less than each of the plurality of distances.

11 Claims, 8 Drawing Sheets

U.S. PATENT DOCUMENTS

| | | | |
|---|---|---|---|
| 2005/0254453 | A1 | 11/2005 | Barneah |
| 2005/0259597 | A1 | 11/2005 | Benedetto |
| 2006/0013154 | A1 | 1/2006 | Choi et al. |
| 2006/0023677 | A1 | 2/2006 | Labrador |
| 2006/0084444 | A1 | 4/2006 | Kossi et al. |
| 2006/0126535 | A1 | 6/2006 | Sherman |
| 2006/0128349 | A1 | 6/2006 | Yoon |
| 2006/0148516 | A1 | 7/2006 | Reddy et al. |
| 2006/0153157 | A1 | 7/2006 | Roh et al. |
| 2007/0008925 | A1 | 1/2007 | Dravida et al. |
| 2007/0019594 | A1 | 1/2007 | Perumal et al. |
| 2007/0110092 | A1 | 5/2007 | Kangude et al. |
| 2007/0217346 | A1 | 9/2007 | Zheng |
| 2007/0287437 | A1 | 12/2007 | Cartmell |
| 2008/0080401 | A1 | 4/2008 | Ribiere |
| 2008/0144493 | A1 | 6/2008 | Yeh |
| 2008/0159236 | A1 | 7/2008 | Ch'ng |
| 2008/0192737 | A1 | 8/2008 | Miyazaki |
| 2009/0041039 | A1 | 2/2009 | Bear |
| 2009/0175223 | A1* | 7/2009 | Hall .............................. 370/328 |
| 2009/0201860 | A1* | 8/2009 | Sherman et al. .............. 370/329 |
| 2010/0067451 | A1 | 3/2010 | Hall |
| 2010/0279776 | A1 | 11/2010 | Hall |
| 2010/0304759 | A1 | 12/2010 | Leppanen et al. |
| 2011/0081973 | A1 | 4/2011 | Hall |
| 2011/0102459 | A1 | 5/2011 | Hall |
| 2011/0103302 | A1 | 5/2011 | Hall |
| 2011/0105151 | A1 | 5/2011 | Hall |

OTHER PUBLICATIONS

U.S. Appl. No. 13/169,829, filed Jun. 27, 2011, Hall.
U.S. Appl. No. 13/277,895, filed Oct. 20, 2011, Hall.
Ko et al., "Geocasting in Mobile Ad Hoc Networks: Location-based Multicast Algorithms", Technical Report TR-98-018 Texas A&M University, Sep. 1998.
Ko, et al., "Flooding-Based Geocasting Protocols for Mobile Ad Hoc Networks," Mobile Networks and Applications, Dec. 2002, 7, 471-480.
Hall et al., "A Two-Level Quality of Service Scheme for Collision based on Mobile Ad Hoc Networks", IEEE, 1-4244-1513-06/07, 2007, 8 pages.
Hall, "RTEQ: Modeling and Validating Infinite-State Hard-Real-Time Systems", AT&T Labs Research, ASE 2007, Nov. 2007, 4 pages.
Hall, "Cheating Attacks and Resistance Techniques in Geogame Design," Proc. 2010 ACM FuturePlay Symposium, 2010, 82-89.
Hall, "An Improved Geocast for Mobile Ad Hoc Networking," IEEE Transactions on Mobile Computing, 2010, 1-14.
Illyas, "Body Personal, and Local Ad Hoc Wireless Networks", Chapter 1, CRC Press, 2003, 22 pages.
Liao et al., "GRID: A Fully Location-Aware Routing Protocol for Mobile Ad Hoc Networks", Telecommunication Systems, 2001, 18, pp. 1-26.
Shih et al., A Distributed Slots Reservation Protocol for QoS Routing on TDMA-based Mobile Ad Hoc Networks, 2004, (ICON 2004), Proceedings, 12th IEEE International Conference, Nov. 2004, 2, 660-664.
Shih et al., "CAPC: A Collision Avoidance Power Control MAC Protocol for Wireless Ad Hoc Networks", IEEE Communications Letters, Sep. 2005, 9(9), 859-861.
Tseng et al., "Fully Power-Aware and Location-Aware Protocols for Wireless Multi-hop Ad Hoc Networks", Proc. of IEEE Intl. Conference on Computer Communications and Networks (ICCCn), 2002, 6 pages.
Corbett, et al. "A Partitioned Power and Location Aware MAC Protocol for Mobile Ad Hoc Networks," Technical Report No. 553, University of Sydney, School of Information Technologies, Jul. 2004, 7 pages.
Panta, "GeoV2V: Vehicular Communications Using a Scalable Ad Hoc Geocast Protocol," AT&T Labs Research, 14 pages.
Balasubramaniam, et al. "Interactive WiFi Connectivity for Moving Vehicles," Proceedings of SIGCOMM, Aug. 17-22, 2008, 12 pages.
Maihofer, "A Survey of Geocast Routing Protocols," IEEE Communications Surveys, Jun. 2004, 32-42.
Das, et al., "SPAWN: A Swarming Protocol for Vehicular Ad-Hoc Wireless Networks," Proceedings of 1$^{st}$ ACM Vanet, Oct. 2004, 2 pages.
German Aerospace Center, Simulation of Urban Mobility, 2010, http://sumo.sourceforge.net, 1 page.
Gupta, et al., "The Capacity of Wireless Networks," IEEE Transactions on Information Theory, 46(2), Mar. 2000, 17 pages.
Hadaller, et al., "Vehicular Opportunistic Communication Under The Microscope," Proceedings of MobiSys, Jun. 11-14, 2007, 206-219.
Heissenbüttel, et al., "BLR: Beacon-Less Routing Algorithm for Mobile Ad-Hoc Networks," Elsevier's Computer Communications Journal, 27, 2003, 15 pages.
Hall, et al., "A Tiered Geocast Protocol for Long Range Mobile Ad Hoc Networking," Proceedings of the 2006 IEEE Military Communications Conf., 2006, 8 pages.
Hull, et al., "CarTel: A Distributed Mobile Sensor Computing System," Proceedings of ACM SenSys, Nov. 2006, 14 pages.
Eriksson, et al., "Cabernet: Vehicular Content Delivery Using WiFi," Proceedings of Mobicom, Sep. 2008, 12 pages.
Karp, et al, "GPSR: Greedy Perimeter Stateless Routing for Wireless Networks," Proceedings of Mobicom, 2000, ACM 2000, 12 pages.
Kuhn, et al., "Geometric Ad-Hoc Routing: Of Theory and Practice," Proc. 2003 Symposium on Principles of Distributed Computing, ACM 2003, 10 pages.
Lee, et al., "CarTorrent: A Bit-Torrent System for Vehicular Ad-Hoc Networks," Mobile Networking for Vehicular Environments, Sep. 2007, 6 pages.
Lee, et al., "Efficient Geographic Routing in Multihop Wireless Networks," Proc. MobiHoc 2005, ACM, 2005, 12 pages.
Ni, et al., "The Broadcast Storm Problem In a Mobile Ad Hoc Network," Proceedings of the 5$^{th}$ Annual ACM/IEEE International Conference on Mobile Computing and Networking, ACM, 1999, 151-162.
Manvi, et al., "Performance Analysis of AODV, DSR, and Swarm Intelligence Routing Protocols in Vehicular Ad Hoc Network Environment," Proceedings of IEEE Future Computer and Communications, Apr. 21-25, 2009.
Niculescu, et al., "Trajectory Based Forwarding and Its Applications," Proc. Mobicom 2003, ACM, 2003, 13 pages.
Ns-2, "The Network Simulator," 2010, http://isi.edu/nsnam/ns, 2 pages.
Schwingenschlogl, "Geocast Enhancements Of AODV for Vehicular Networks," ACM SIGMOBILE Mobile Computing and Communications Review, Jun. 2002, 18 pages.
Shevade, et al., "Enabling High-Bandwidth Vehicular Content Distribution," Proceedings of CoNEXT 2010, Nov. 30-Dec. 3, 2010, 12 pages.
Yassein, et al., "Performance Analysis of Adjusted Probabilistic Broadcasting in Mobile Ad Hoc Networks," Proc. 11$^{th}$ Intl. Conf. On Parallel and Distributed Systems Workshops, 2005, 27 pages.
Zahn, et al., "Feasibility of Content Dissemination Between Devices In Moving Vehicles," Proceedings of CoNEXT 2009, Dec. 1-4, 2009, 11 pages.
Zorzi, et al., "Geographic Random Forwarding (GeRaF) for Ad Hoc and Sensor Networks: Multihop Peformance," IEEE Transactions on Mobile Computing, Dec. 2003, 11 pages.
Social + Gaming—SWiK: http://swik.net/social+ gaming.
http://askville.amazon.com/Wii-games-play-Internet-Family/AnswerViewer.do?requestId=6796582(2007).
Schutzberg, "Phone-based GPS-based Games: Missing Pieces"; http://www.directionsmag.com/articlephp?article_id=939 (Aug. 17, 2005).
"Boost Mobile Introduces First Location-based, GPS games in US" http://www.physorg.com/news5824.html (Aug. 16, 2005).
"Sony bigwig hints at GPS-enabled PSP games"; http:www.vespacious.com/sony-bigwig-hints-at-gps-enabled-psp-games.html (Dec. 22, 2008).
STEVE:"GPS-enabled Cell Phone Games" http://www.stragenewproducts.com/2005/08/gps-enabled-cell-hone-games.html (Aug. 15, 2005).
Location-Enabled Mobile Gaming: http://www.nn4d.com/site/global/market/affiliate_sites/lbsglobe/lbsapplications/mobilegaming.jsp (2007).

* cited by examiner

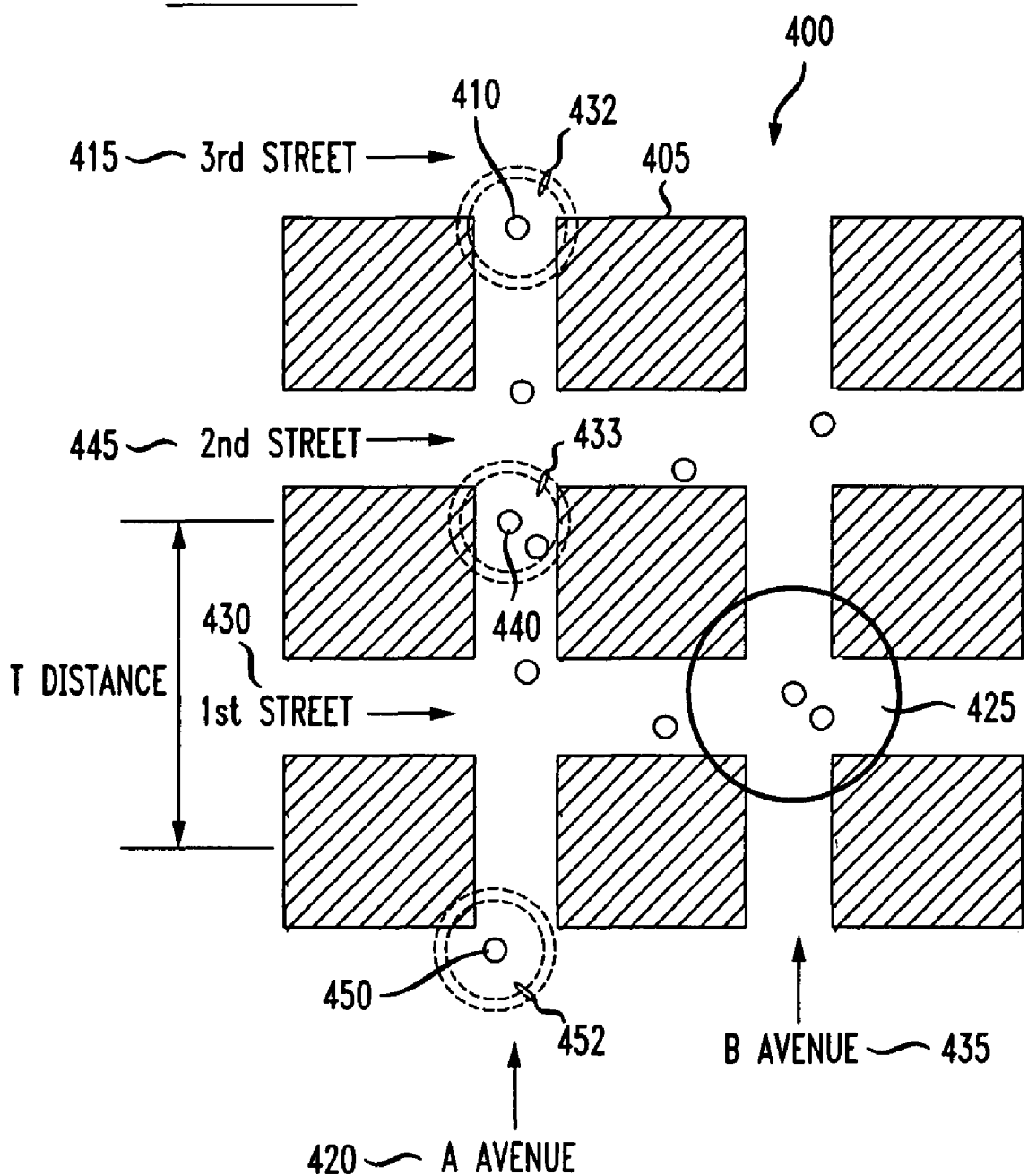

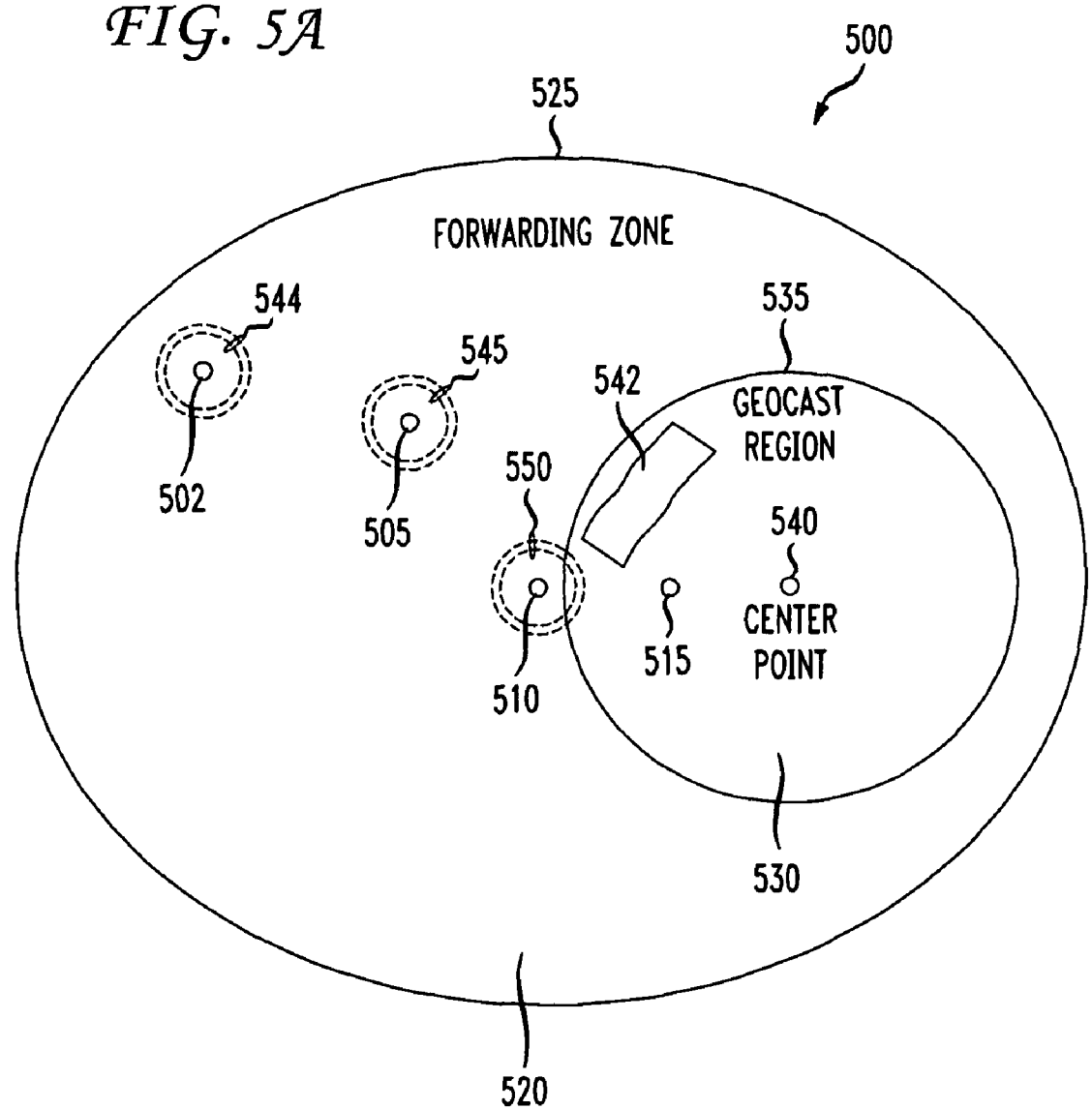

SYSTEM AND METHOD FOR GEOCASTING IN A MOBILE AD HOC NETWORK

BACKGROUND OF THE INVENTION

The present invention is directed to mobile ad hoc networks (MANETs). More specifically, the present invention is directed to a system and method for geocasting data packets in a MANET.

A MANET is a network of mobile wireless terminals, such as wireless phones, that communicate with each other within a given region or area. A MANET does not require or use "base station" terminals to control the communications between the wireless terminals. Each wireless terminal is capable of receiving/transmitting data packets to/from other wireless terminals in the MANET.

In a MANET, when a wireless terminal intends to send the same information to more than one destination (i.e., more than one wireless terminal recipient), it will typically broadcast (i.e., transmit the information so that any terminal within range can receive it) or multicast (i.e., a series of broadcasts from terminal to terminal through the network) the information instead of transmitting a series of unicasts (i.e., a separate transmission to each intended recipient). In a traditional broadcast, the broadcasting wireless terminal will transmit the information once and hope that all the intended recipients are in range to receive the transmission. The intended recipients that are outside the range of the broadcasting terminal, however, will not be able to receive the message. Another technique such as multicasting would have to be used to get the message to such remote terminals.

In a conventional multicast, the intended recipients register to a predetermined group address. The originating (sending) wireless terminal will address the message to the group address and transmit the message once. The message will then be passed or retransmitted from wireless terminal to wireless terminal (multicast) throughout the MANET so that all the group members have a chance of receiving the multicast message no matter where they are located. Multicasting has been found to be a much more effective technique than broadcasting when intended recipients are located outside the range of the originating wireless terminal.

Although multicasting, and in some cases broadcasting, are effective when the intended recipients are scattered throughout the MANET, they are not efficient for applications where the intended recipients are all located in a defined physical area. For example, when trying to send messages to everyone in a disaster area or all troops in a given battle venue, multicasting can result in utilizing the processing power of the MANET for many unnecessary transmissions. That is, multicasting may result in multiple retransmission or rebroadcasts by wireless terminals that are not the intended recipients and by Wireless terminals that are located in areas remote from the disaster area or the battle venue. Moreover, due to the fact that mobile terminals move often and unpredictably, it is impractical to maintain a (registered) multicast group for each arbitrary geographic region. As a result, for such applications, a technique called geographical broadcasting, or geocasting, is preferred.

The basic idea of a geocast is to send a packet to every node geographically positioned within a specified region called a geocast region. The set of wireless terminals in the geocast region are referred to as the geocast group. If a wireless terminal resides in the geocast region it will automatically become a member of the corresponding geocast group, and thus no registration is necessary (as in conventional multicasting). A wireless terminal may therefore send a message to every wireless terminal in the geocast group by addressing the message to the geocast region.

One approach that has been proposed for geocasting in a MANET is a technique called location-based flooding. Geocasting through location-based flooding requires that the wireless terminals in the MANET are equipped with the ability to determine their own location using, for example, a Global Positioning System (GPS), and are able to determine the coordinates that define the geocast region (typically from a geographic "address" within the data packet itself). The wireless terminal initiating or originating the communication will address the packets to include its own location coordinates and a description of the geocast region, and then broadcast the packets to its neighboring wireless terminals. Each neighboring wireless terminal will then compare the geocast region coordinates to its own location. If its location is within the specified geocast region, it will accept the packet, process it, and may also decide to rebroadcast, or retransmit, the packet to its neighboring wireless terminals. If the wireless terminal's location is outside the geocast region, the wireless terminal will not process the packet but may decide to retransmit the packet in order to further propagate the packet to wireless terminals that may not as yet have received the packet. If the wireless terminal decides to retransmit, the wireless terminal will typically include its own location information in the retransmitted packet. This process may be repeated as the packet is retransmitted through the MANET.

In such present-day systems, the decision whether to retransmit is typically made based upon rules or heuristics that may take into account from how far away the received packet was transmitted. To do this, the wireless terminal that receives the packet compares its present geographical location to the geographical location of the sending wireless terminal (obtained from the location information in the packet). Packets that have been received from sending terminals that are located no closer than some minimum distance away are retransmitted. All other packets may be dropped.

Although such present-day algorithms are robust, they are not efficient for geographically large MANETs. In geographically large MANETs, such algorithms may result in the packets traveling paths having many "hops" and therefore taking a long time to be transmitted from source to destination. In addition, when the MANET includes a large number of wireless terminals in an extended area, such algorithms tend to result in many unnecessary retransmissions, wasting the resources of the MANET.

Additionally, current geocasting algorithms often have trouble in certain environments. For example, the maze-like characteristics of city-style geometries present difficulties, typically due to the need for precise selection of relay points.

BRIEF SUMMARY OF THE INVENTION

Therefore, there remains a need for a geocast algorithm that can be implemented by a wireless terminal to determine whether to retransmit packets in a MANET in a more efficient manner as well as an algorithm that can better handle complex environments such as city-style geometries.

In accordance with an embodiment of the present invention, a wireless terminal determines whether to retransmit a received packet. The wireless terminal is configured to determine a first distance from the wireless terminal to a point (e.g., the center point) in a geocast region. The wireless terminal is also configured to determine a plurality of distances between the point and each of a plurality of wireless terminals from which the wireless terminal has previously received a packet having an identifier that is the same as an identifier of the received packet. The wireless terminal is configured to retransmit the received packet if the first distance is less than each of the plurality of distances. In one embodiment, the received packet is discarded if the first distance is not less than each of the plurality of distances.

In one embodiment, the received packet is stored in a transmit queue. A priority may be assigned to the received packet. The priority may be based on differences between the first distance and each of the plurality of distances. The received packet's priority may determine when the received packet is retransmitted by the wireless terminal.

These and other advantages of the invention will be apparent to those of ordinary skill in the art by reference to the following detailed description and the accompanying drawings.

BRIEF DESCRIPTION OF THE DRAWINGS

FIG. 4 is a block diagram of a prior art city-style layout having nodes forming a MANET as well as buildings which block the node signals;

FIG. 5A is a diagram of a network having a plurality of wireless terminals executing an algorithm in accordance with an embodiment of the present invention;

DETAILED DESCRIPTION

Figure 1:
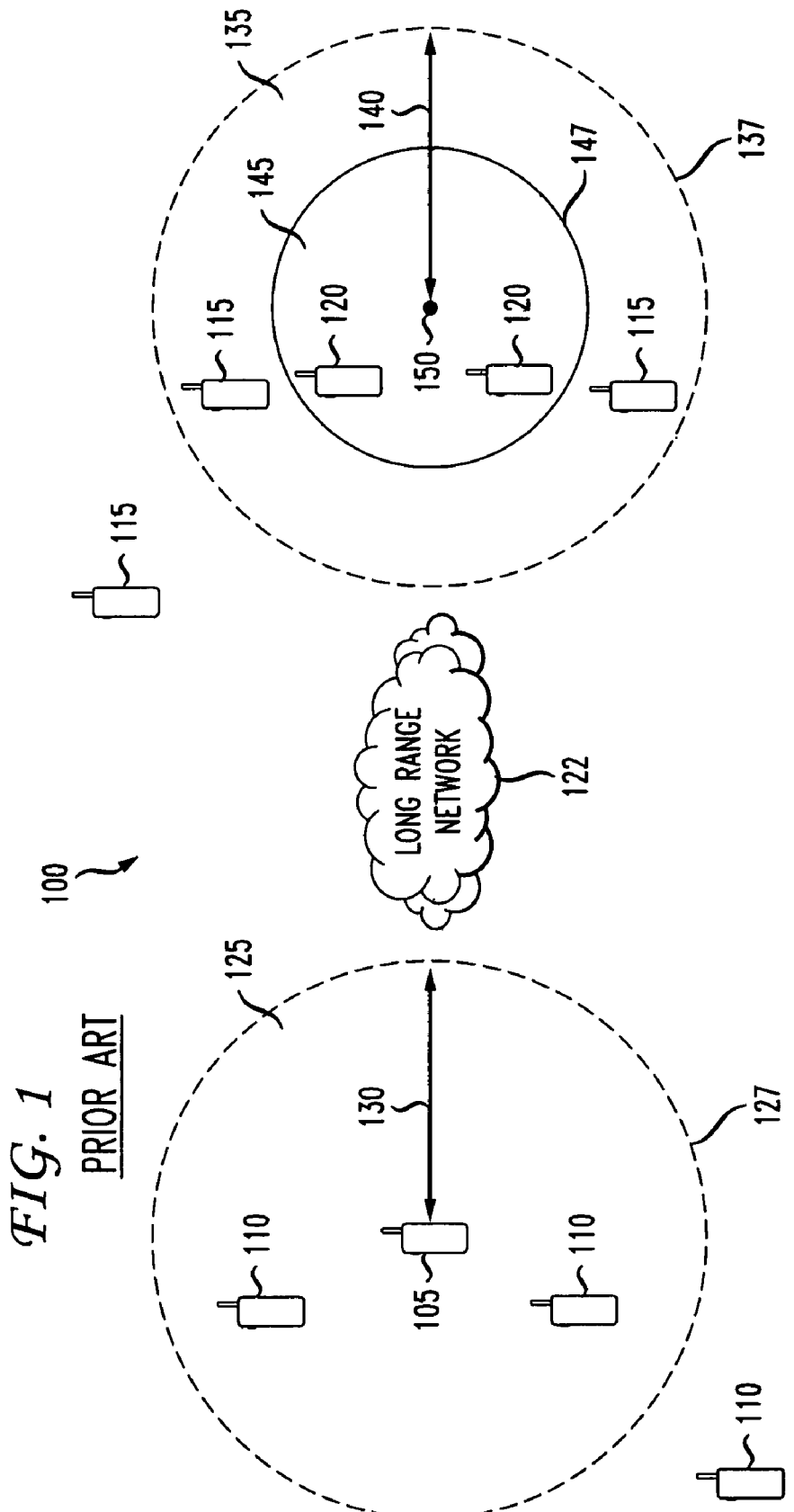
FIG. 1 is a block diagram of a prior art network having a plurality of nodes that form a MANET.

FIG. 1 shows a prior art network 100 having a plurality of wireless terminals (also referred to as nodes) 105, 110, 115, and 120 that form a MANET. Each wireless terminal 105, 110, 115, and 120 is operable to determine its own geographical location through any type of location determination system including, for example, the Global Positioning System. Each wireless terminal is operable to transmit and receive packets on the MANET. This geocast framework includes a heuristics-based limited flooding technique, also referred to below as flat geocast.

At any given time, one or more of the wireless terminals may be operable to transmit and receive packets over a long-range network 122. The long-range network 122 can be any network in which packets can be transmitted from one long-range capable wireless terminal to another long-range capable wireless terminal.

Network 100 has an origination region 125 (outlined by origination region boundary 127) that covers a geographical area. This is generally circular in one set of preferred embodiments with a radial distance 130 around wireless terminal 105 as the center point. Network 100 also has a termination region 135 (outlined by termination region boundary 137) that covers a geographical area. In one set of preferred embodiments, this termination region is generally circular with a radial distance 140 from a center point 150. The termination region 135 surrounds and includes geocast region 145 (outlined by geocast region boundary 147). The origination and termination regions 125, 135 are also referred to as forwarding zones. Although shown as circles, origination and termination regions 125 and 135 can be defined in terms of other geometric shapes such as rectangles, hexagons, irregular shapes, curvilinear shapes, or in any desired mixture of such shapes. Moreover, the information that defines these regions, e.g. the location, size and shape, can be carried in the packets themselves. The information may therefore vary from packet to packet or it can be fixed in advance of communications (and in such an embodiment need not be carried in each packet).

Wireless terminal 105 and some of its neighboring wireless terminals 110 are located within the origination region 125. Some of the wireless terminals 115 and all of the wireless terminals 120 are located within the termination region 135.

When originating wireless terminal 105 wants to geocast a packet to wireless terminals 120 located in geocast region 145, wireless terminal 105 will assign the packet with its own location coordinates (as the sending location) and the location coordinates of the geocast region. If the originating wireless terminal 105 is not long range capable at the time it wishes to transmit, it may then initiate a location-based flooding of the packet to all neighboring wireless terminals 110 on the MANET. A wireless terminal 110 that is long-range capable at the time of receiving the packet (whether in the origination region 125 or not) will retransmit the packet on the long-range network 122 to all long range capable terminals 115 or 120 located within the termination region 135. If a plurality of wireless terminals 110 receive the packet, some subset of them may decide, based upon a location-based flooding decision algorithm, such as that described below, to retransmit the packet on the long-range network 122. Others can avoid retransmitting on the long-range network 122 if they determine that a packet with the same geocast ID has already been thus transmitted, this decision again being based upon a location-based flooding decision algorithm. Each long range capable wireless terminal 115 or 120 receives the packet and compares its own location to the location of the geocast region 145. If the location of the receiving wireless terminal 115 or 120 is within a distance 140 of the center of the geocast region 145, hence located within the termination region 135, it may choose to transmit the packet on the MANET, initiating or continuing the location-based flooding of the termination region 135. The decision of whether to transmit as part of the location-based flooding may be made based upon a location-based flooding decision algorithm such as the one described below and shown in FIG. 2. If a wireless terminal 115 that is not located within the termination region 135 (and not within the origination region 125) receives the packet, the wireless terminal 115 does not retransmit the packet on the MANET.

Packets transmitted over the long-range network 122 from the wireless terminals 110 will be received over the long-range network 122 by wireless terminals 115 and 120. The wireless terminals 115 that are located outside the termination region 135 will not retransmit the packet on the MANET. The wireless terminals 115 that are located within the termination region 135 and the wireless terminals 120 located within the geocast region 145 will participate in location-based flooding of the termination region 135 and hence may decide to retransmit the packet on the MANET.

In more detail, each geocast packet p contains a geocast header containing information needed for propagating the packet. This information may include an application type, a geocast ID (gID(p)), and the center of the targeted geocast region, CGR(p). The application type is used as an index to determine the values of geocast parameters to use with the packet, including forwarding zone definitions and parameter values governing the heuristics. The geocast ID is a unique identifier assigned by the originator of the geocast and is carried in each transmission associated with that particular geocast.

Figure 2:
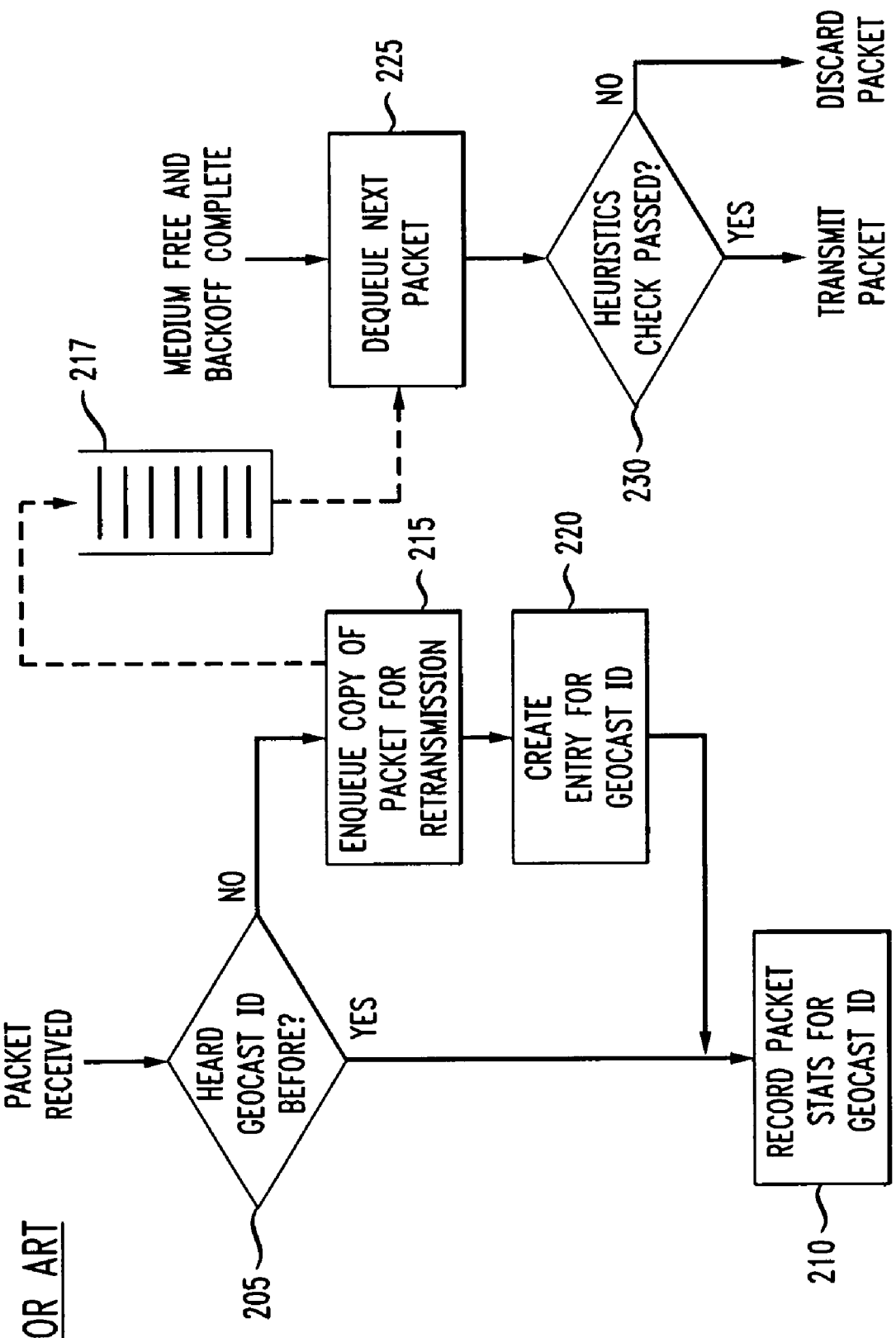
FIG. 2 is a flowchart illustrating prior art geocasting steps performed by a node.

FIG. 2 is a flowchart illustrating the prior art process for performing flat geocast. A wireless terminal, or node, receives a packet and determines whether the node has previously received a geocast packet having the same geocast ID as the currently received geocast packet (step 205). If so, the node records packet statistics for the geocast ID in step 210. If not, the node executes step 215 and queues the packet in a transmit queue 217 for potential retransmission the first time that the packet is heard. The node then creates an entry for the geocast ID in a table (e.g., in a database) in step 220 before recording the packet statistics in step 210.

The node also dequeues packets stored in its transmit queue 217 in step 225. When a packet reaches the head of the queue and is ready to be transmitted, a heuristics check is performed. Heuristics are one or more rules that need to be satisfied in order for the packet to be retransmitted. If the heuristics check passes in step 230, the packet is retransmitted. If not, the packet is discarded.

The heuristics check is performed on a packet p that is ready to be transmitted as follows:

$$Pass(p) \equiv InFwdZone?(p) \wedge (h_1(p) \vee h_2(p) \vee \ldots)$$

Thus, first the node must be located physically in the forwarding zone defined by p's application type and other header information. Next, it must pass at least one of the $\{h_i\}$ predicates. Note that there is an $h_0$ which is true whenever the packet is originated by the node itself; this ensures that all packets are transmitted by the originator.

If all $h_i$ are false, then a broadcast for each geocast occurs, with no retransmissions. This is scalable, but typically unreliable. If, on the other hand, $h_1(p)$ ≡true, then flooding restricted to forwarding zones occurs. This is typically reliable, but unscalable, resulting in many retransmissions per geocast.

Positioned between flooding and broadcasting is classic geocast. Classic geocast is more reliable than broadcast and also more scalable than flooding. Classic geocast uses two primary heuristics, the threshold (T) and MinTrans (M) heuristics. The M heuristic, $h_M$, counts the number of transmissions received for each geocast ID. $h_M$ is true if and only if this count is less than the M parameter. The T heuristic, $h_T$, records the location of the transmitter of each transmission. Then $h_T$ is true if and only if the closest among all transmitters of packets with the same geocast ID are at least a distance T away from this node.

Figure 3:
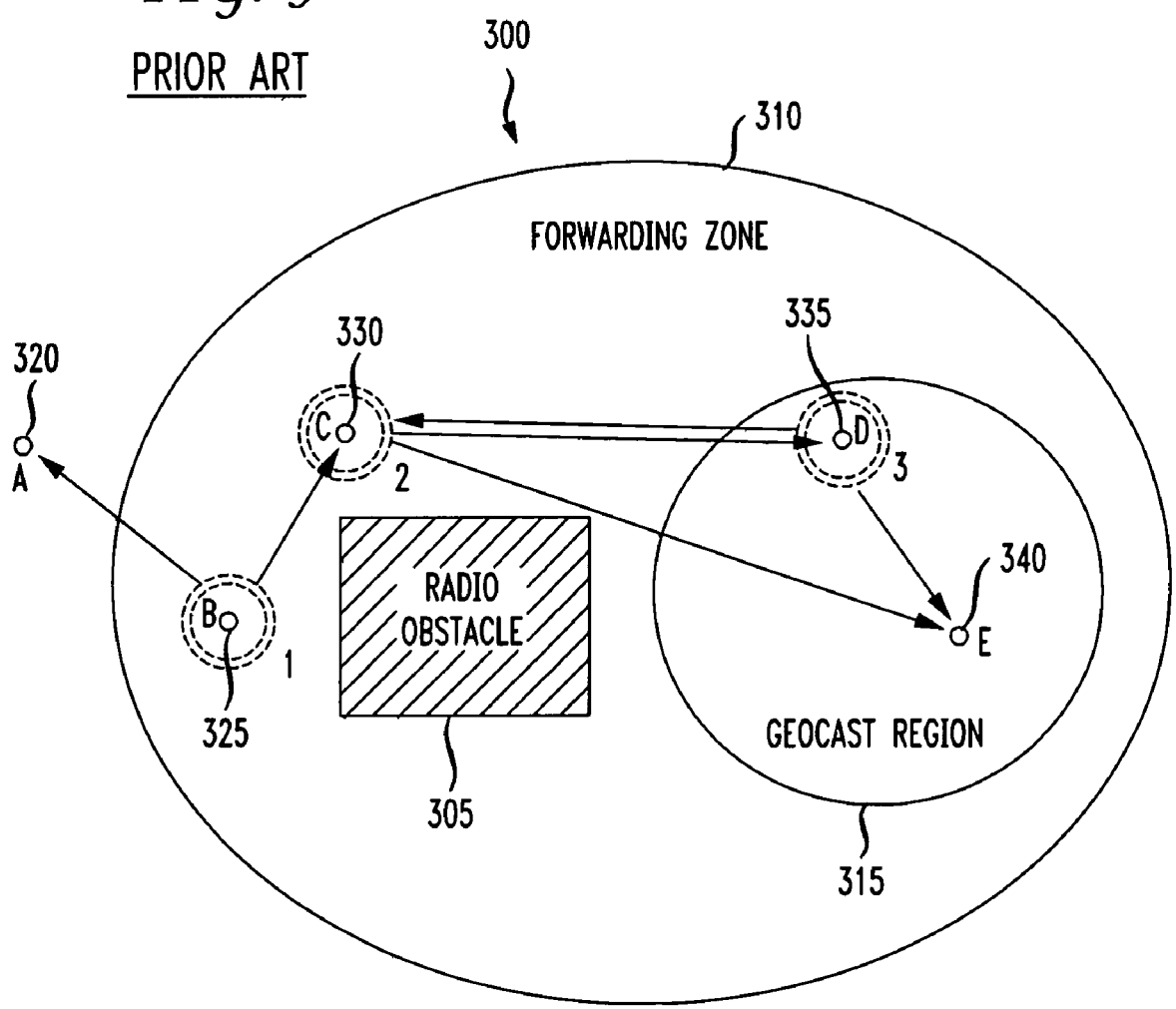
FIG. 3 is a block diagram of a prior art network having a plurality of nodes that form a MANET with a radio obstacle.

FIG. 3 is a more detailed block diagram of a classic geocast transmission network 300 with one radio obstacle 305. The radio obstacle 305 may be, for example, a building or structure. A forwarding zone 310 in the network 300 is generally elliptical and a geocast region 315 in the forwarding zone 310 is generally circular. With respect to the distance T and the M parameter, in one set of prior art embodiments, M=2 and the distance T=40% of the radio range.

The network 300 includes five nodes—an A node 320, a B node 325, a C node 330, a D node 335, and an E node 340. The geocast originator (i.e., a first sending terminal) is node B 325. The first transmission reaches nodes A 320 and C 330. Node A 320 is located out of the forwarding zone 310 and, as a result, does not retransmit. Because of the M heuristic, node C 330 retransmits (because node C 330 thus far has only received one transmission) and nodes D 335 and E 340 hear node C's retransmission. Nodes D 335 and E 340 are in the geocast region and so they process the packet.

Due to the M heuristic, however, node D 335 retransmits (because node D 335 thus far has only received one transmission). Node E 340 does not retransmit because no heuristic passes (D's transmission was too close for $h_T$, and E 340 had already counted two transmissions, so $h_M$ was not satisfied either).

Forwarding zone flooding would have led to nodes B 325, C 330, and D 335 retransmitting, while broadcast would have had only node B 325 retransmitting (but then nodes D 335 and E 340 would have failed to receive it). Thus, classic geocast successfully traverses the obstacle while avoiding exhaustive re-transmissions.

Classic geocast, however, does not typically perform correctly in urban terrain. Urban terrain is traditionally characterized by restricted radio lines of site due to buildings, etc., multi-path effects further reducing signal coverage, and high node density per a given area. This maze-like characteristic is typically not handled properly by classic geocast. Specifically, classic geocast typically fails in a city-style layout.

FIG. 4 is a block diagram of an example urban layout 400. In layout 400, nodes are located in streets and avenues of a city-like geometry. The dark blocks, such as block 405, represent buildings that block radio signals. An originating node 410 located at $3^{rd}$ Street 415 and A Avenue 420 transmits a geocast packet whose destination is a node inside geocast region 425 (e.g., a node between $1^{st}$ Street 430 and B Avenue 435).

A typical classic geocast transmission is shown in FIG. 4. Transmission 432 originates from originating node 410. The transmission is received by every node on A Avenue 420. Due to the M heuristic, transmission 433 is sent from a node 440 on A Avenue 420 between $1^{st}$ Street 430 and $2^{nd}$ Street 445. Finally, because the node 450 below $1^{st}$ Street 430 on A Avenue 420 is beyond the T heuristic distance, $h_T$ causes transmission 452 from node 450 as shown. All three transmissions, however, are only received by nodes 410, 440, 450 on A Avenue 420. Nodes off of A Avenue 420 did not hear the transmissions 432, 433, 452, and so the geocast fails to reach the geocast region 425.

One may compensate for the failing of the classic geocast in reaching the geocast region 425 by either increasing M or decreasing T. Although these techniques may increase the success rate, these techniques also increase transmissions.

To increase the success rate of a geocast in a maze-like layout, another heuristic can be utilized (e.g., in addition to the M and T heuristics). In accordance with an embodiment of the present invention, a wireless terminal determines whether to retransmit a received packet by executing a heuristic referred to below as $h_{CD}$. The wireless terminal determines a first distance from the wireless terminal to a point (e.g., the center point) in a geocast region. The wireless terminal also determines a plurality of distances between the point and each of a plurality of wireless terminals from which the wireless terminal has previously received a packet having an identifier that is the same as an identifier of the received packet. The wireless terminal then retransmits the received packet if the first distance is less than each distance in the plurality of distances.

FIG. 5A is a diagram of a network 500 having a plurality of wireless terminals 502, 505, 510, 515 that employ $h_{CD}$ in accordance with an embodiment of the present invention. The wireless terminals 502, 505, 510, 515 are located within a forwarding zone 520 (outlined by boundary 525). The wireless terminals 502, 505, 510, 515 employ the heuristic $h_{CD}$ in order to transmit packets to the terminal 515 in geocast region 530 (outlined by boundary 535). The geocast region 530 has a center point 540 and a building 542 which blocks radio signals.

When a terminal 502, 505, 510, 515 (also referred to as node 502, 505, 510, 515 below) executes the heuristic $h_{CD}$, the node 502, 505, 510, 515 retransmits a received packet P when it is closer to the center point 540 than other nodes in the network 500 from which it has received packets having the same geocast ID as the packet P. For example, suppose node 502 broadcasts a packet (shown with transmission circle 544). Node 505 receives the packet and then determines whether to process the packet and retransmit the packet based at least on the heuristic $h_{CD}$.

Node 505 determines that the distance between node 502 and the center point 540 is greater than the distance between node 505 and the center point. As a result, node 505 retransmits the packet again (as shown with transmission circle 545 indicating a packet transmission).

Node 515 does not receive the packet from node 505 because building 542 blocks the packet from node 505. Node 510 receives the packet from node 505 and then determines its distance to the center point 540. Node 510 compares this distance to the distance between node 505 and the center point 540 as well as the distance between node 502 and the center point 540. In this scenario, the node 510 retransmits the packet because its distance to the center point 540 is less than the distance between the node 505 and the center point 540 and the distance between node 502 and the center point 540. This retransmission is shown with transmission circle 550. Note that in prior art Classic Geocast embodiments having M=2 and sufficiently large radio range and T values, node 510 would have chosen not to retransmit since it would have heard the packet twice. Thus, in accordance with an embodiment of the present invention, more transmissions occur relative to the number of transmissions that occur in these prior art embodiments.

As a result of the transmission 550 from node 510, node 515 inside the geocast region 530 receives the packet (because building 542 does not block the transmission 550 from node 510). Thus, the transmission to the geocast region 530 is successful.

Figure 5B:
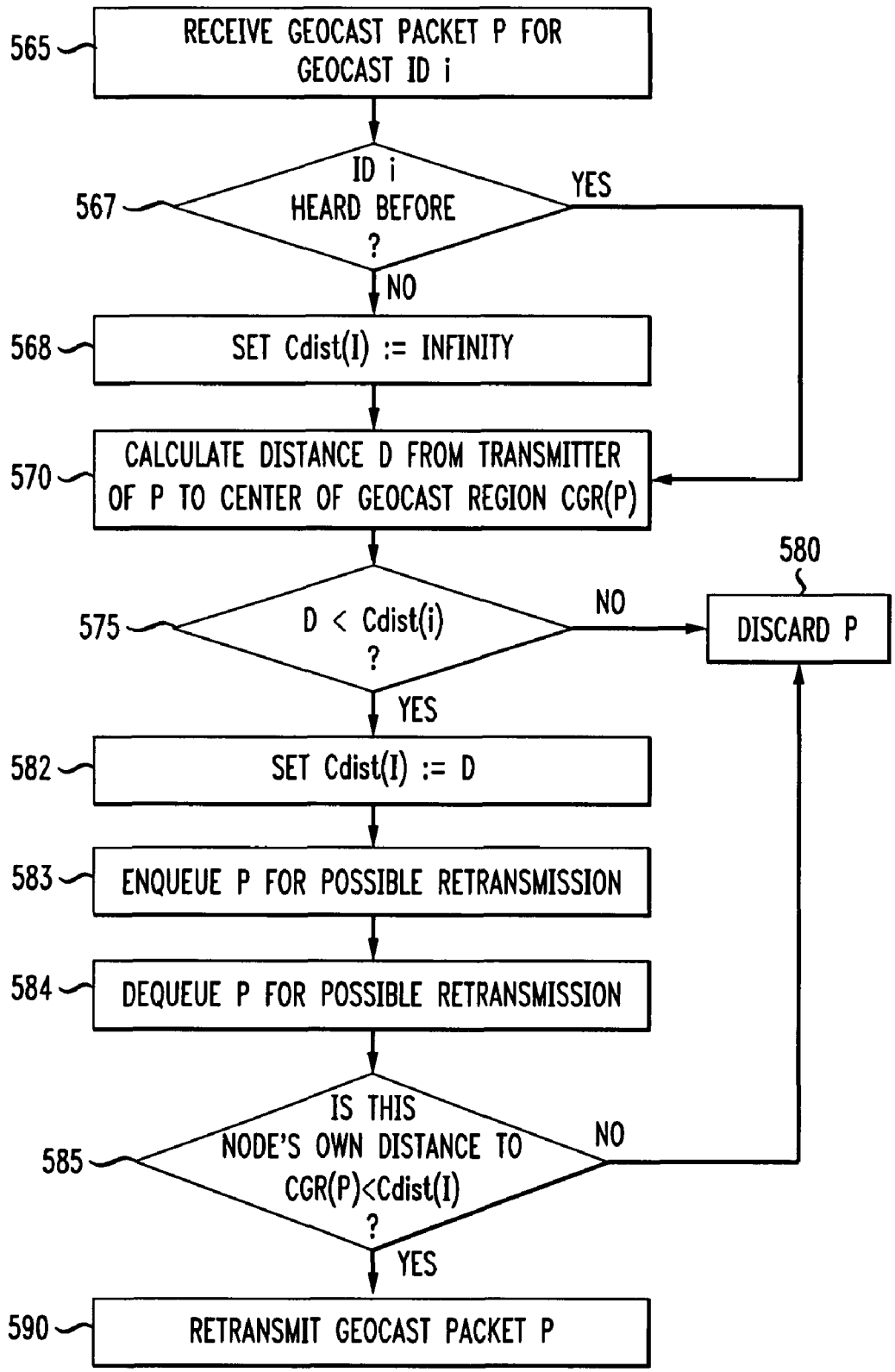
FIG. 5B is a flowchart illustrating the algorithm performed by a node in accordance with an embodiment of the present invention.

FIG. 5B shows a flowchart of the steps performed by a node in accordance with an embodiment of the present invention. The node receives a geocast packet p for geocast ID i in step 565. The node then determines, in step 567, whether any geocast transmissions have previously been heard having geocast ID I. If not, then in step 568 the node's database is initialized to have the value Cdist(i)=infinity. Cdist(i) represents the minimum distance from CGR(P) of all transmissions having geocast ID i heard by the node. The node then determines, in step 570, the distance D from the transmitter of p to the center of the geocast region CGR(p). The node then determines whether the distance D from the transmitter of p to the center of the geocast region is less than all such distances for all transmissions it has heard with geocast ID i in step 575. If the distance is not less than all such distances, the node discards the packet in step 580. If the distance is less than all such distances, the node stores the distance in Cdist(i) in step 582 and then the node stores the packet P in a transmit queue (as shown in FIG. 2) in step 583. Some possibly extended period of time may pass, after which the packet P is dequeued for possible retransmission in step 584. This amount of time depends on external factors such as how much other traffic exists on the wireless medium, how many other packets may need to be transmitted by the node prior to the node transmitting P, and any ordering of the waiting packets due to prioritization. Note that during this extended period, other packets having geocast ID i may be received by the node (having been transmitted by yet other nodes in the environment who have heard the previous transmissions). The node then determines if the node's own distance to CGR(p) is less than CDist(i) in step 585. If not, the node returns to step 580 and discards the packet. Otherwise, the node retransmits the geocast packet p in step 590.

Thus, a new heuristic $h_{CD}(p)$ is added into the outgoing heuristics check logic shown in FIG. 2. In particular, in one embodiment $h_{CD}(p)$ is true if and only if the node's own distance to CGR(p) is less than CDist(i). In one embodiment, this heuristic is added into the classic geocast disjunction, so the other heuristics still operate as well:

$$\text{InFwdZone?}(p) \wedge (h_T(p) \vee h_M(p) \vee h_{CD}(p))$$

Figure 6:
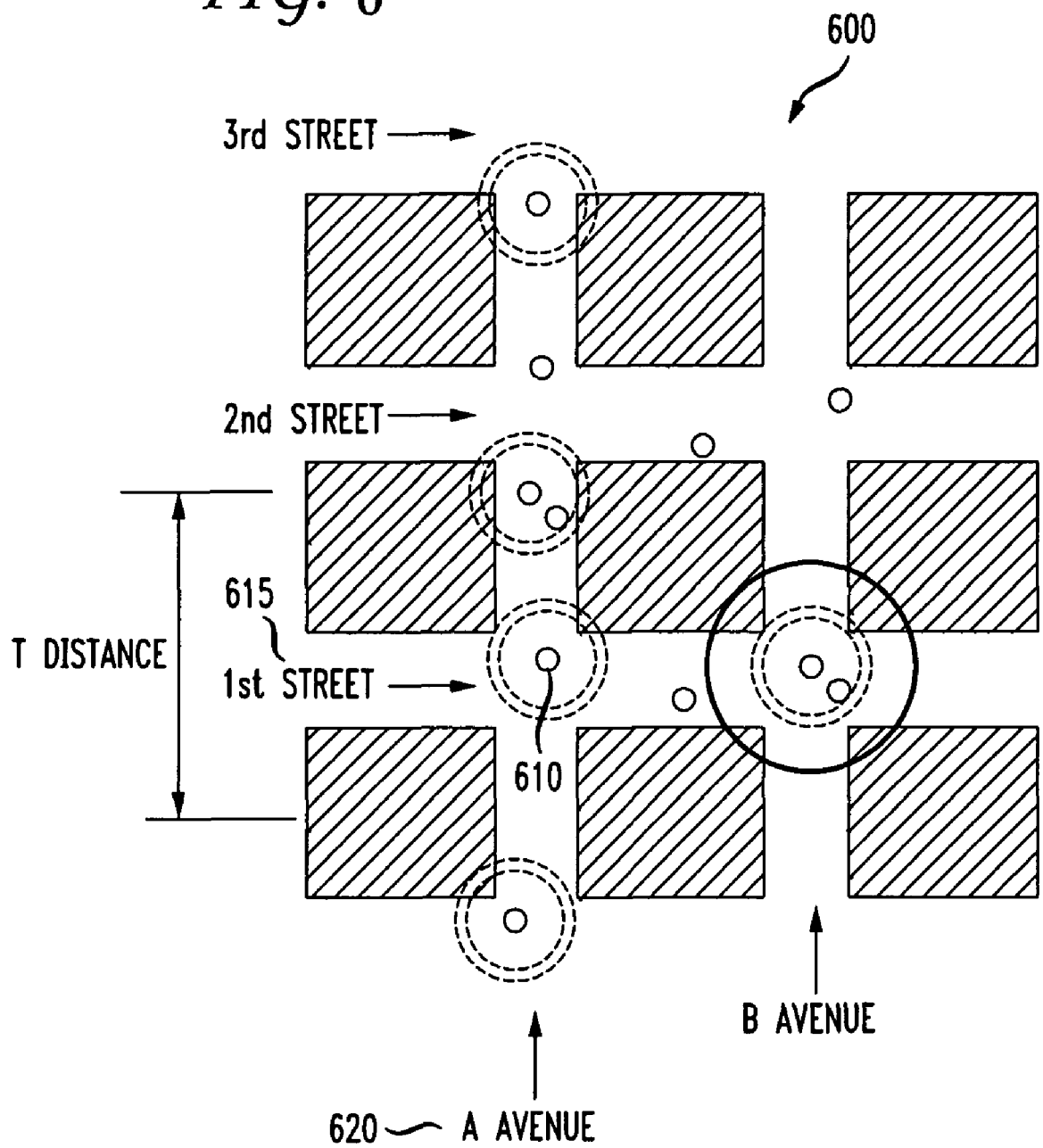
FIG. 6 is a block diagram of a city-style layout having nodes implementing the steps shown in FIG. 5B in accordance with an embodiment of the present invention.

FIG. 6 is a block diagram of the urban layout of FIG. 4 in which the CD heuristic is also executed by the nodes. This time, the first three transmissions are the same as before. However, the node 610 at $1^{st}$ Street 615 and A Avenue 620 realizes that even though T and M heuristics do not pass, the node 610 is closer to CGR(p) than the previous three transmitters, so the node 610 transmits. This is heard by the nodes on $1^{st}$ Street 615, which fulfills the geocast.

In one embodiment, each node prioritizes its transmit queue by center-distance improvement. For each packet in a node's transmit queue, a priority Prio is assigned as follows. First, any non-geocast packet, such as unicast traffic, has Prio=0. For geocast packets p, let d be the distance from node to CGR(p). Then $$\text{Prio}(p) = \max(0, C\text{Dist}(g\text{ID}(p)) - d)$$

Thus, the greater the "improvement" (i.e., reduction of distance to CGR), the higher the priority and, hence, the sooner the packet will be transmitted. Thus, those packets that can most quickly move toward the center of the geocast region are transmitted sooner. Heuristically, this is because the greater the progress toward the center, the more other nodes will be suppressed due to being farther from the center. In one embodiment, the CD-P heuristic results in O(lg n) retransmissions per geocast in any single local area.

Figure 7:
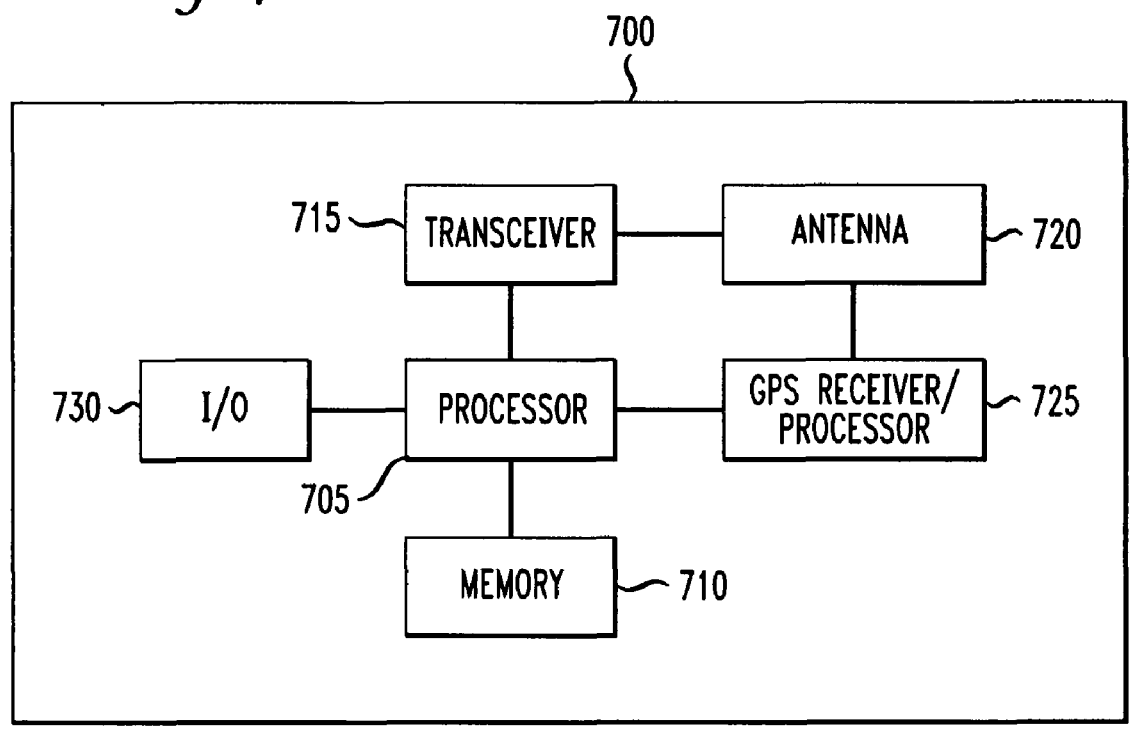
FIG. 7 is a high level block diagram of a node in accordance with an embodiment of the present invention.

It should be understood that a wireless terminal in accordance with the present invention may be any wireless device operable to execute a communications application to perform the above described functions. Such wireless terminals executing a communications application are well known in the art, and may be implemented, for example, using well known processors, transceivers, memory units, storage devices, computer software, and other components. A high level block diagram of such a wireless terminal is shown in FIG. 7. As shown, wireless terminal 700 contains a processor 705 which controls the overall operation of wireless terminal 700 by executing computer program instruction which define the communications application. The computer program instructions may be hard coded in processor 705 or loaded from an erasable programmable read only memory device (not shown) or other non-volatile memory device as are known in the art when execution of the computer program instructions is desired. Thus, the communications application will be defined by computer program instructions stored in processor 705 and/or erasable programmable read only memory (not shown) and the communications application will be controlled by processor 705 executing the computer program instructions. Wireless terminal 700 includes a memory storage device 710 in which information including geographic location information described above can be stored. Wireless terminal 700 also includes one or more transceivers 715 coupled to an antenna 720 through which data is received and/or transmitted in a MANET and/or a long range network. Wireless terminal 700 also includes a GPS receiver/processor 725 that controls the execution of the geographical locating function of wireless terminal 700. Through GPS receiver/processor 725, wireless terminal 700 can use the global positioning system to determine its own location. Wireless terminal 700 also includes input/output 730 which represents devices (e.g., display, keypad, speakers, buttons, etc.) that allow for user interaction with wireless terminal 700. One skilled in the art will recognize that an implementation of an actual wireless terminal will contain other components as well, and that FIG. 7 is a high level representation of some of the components of such a wireless terminal for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for determining whether a wireless terminal will retransmit a received packet, said method comprising:
   determining a first distance from said wireless terminal to a point in a geocast region;
   determining a plurality of distances between said point and each of a plurality of wireless terminals from which said wireless terminal has previously received a packet having an identifier that is the same as an identifier of said received packet;
   storing said received packet in a transmit queue;
   assigning a priority to said received packet, wherein said priority is based on differences between said first distance and each of said plurality of distances; and
   retransmitting said received packet if said first distance is less than each of said plurality of distances.

2. The method of claim 1 wherein said retransmitting further comprises retransmitting said received packet before another packet stored in said transmit queue when said received packet has a priority higher than said another packet.

3. The method of claim 1 further comprising discarding said received packet if said first distance is not less than each of said plurality of distances.

4. The method of claim 1 wherein said point in said geocast region is the center of the geocast region.

5. A wireless terminal configured to determine whether to retransmit a received packet comprising:
   means for determining a first distance from said wireless terminal to a point in a geocast region;
   means for determining a plurality of distances between said point and each of a plurality of wireless terminals from which said wireless terminal has previously received a packet having an identifier that is the same as an identifier of said received packet; and
   means for storing said received packet in a transmit queue;
   means for assigning a priority to said received packet, wherein said priority is based on differences between said first distance and each of said plurality of distances; and
   means for retransmitting said received packet if said first distance is less than each of said plurality of distances.

6. The wireless terminal of claim 5 wherein said means for retransmitting further comprises means for retransmitting said received packet before another packet stored in said transmit queue when said received packet has a priority higher than said another packet.

7. The wireless terminal of claim 5 further comprising means for discarding said received packet if said first distance is not less than each of said plurality of distances.

8. The wireless terminal of claim 5 wherein said point in said geocast region is the center of the geocast region.

9. A computer readable medium, the computer readable medium not being a transient signal, the computer readable medium embodied with computer executable instructions capable of being executed in a processor and defining the steps comprising:
   determining a first distance from a wireless terminal to a point in a geocast region;
   determining a plurality of distances between said point and each of a plurality of wireless terminals from which said wireless terminal has previously received a packet having an identifier that is the same as an identifier of said received packet;
   storing said received packet in a transmit queue;
   assigning a priority to said received packet, wherein said priority is based on differences between said first distance and each of said plurality of distances; and
   retransmitting said received packet if said first distance is less than each of said plurality of distances.

10. The computer readable medium of claim 9 wherein said retransmitting step further comprises the step of retransmitting said received packet before another packet stored in said transmit queue when said received packet has a priority higher than said another packet.

11. The computer readable medium of claim 9 further comprising the step of discarding said received packet if said first distance is not less than each of said plurality of distances.

* * * * *